United States Patent Office 3,641,163
Patented Feb. 8, 1972

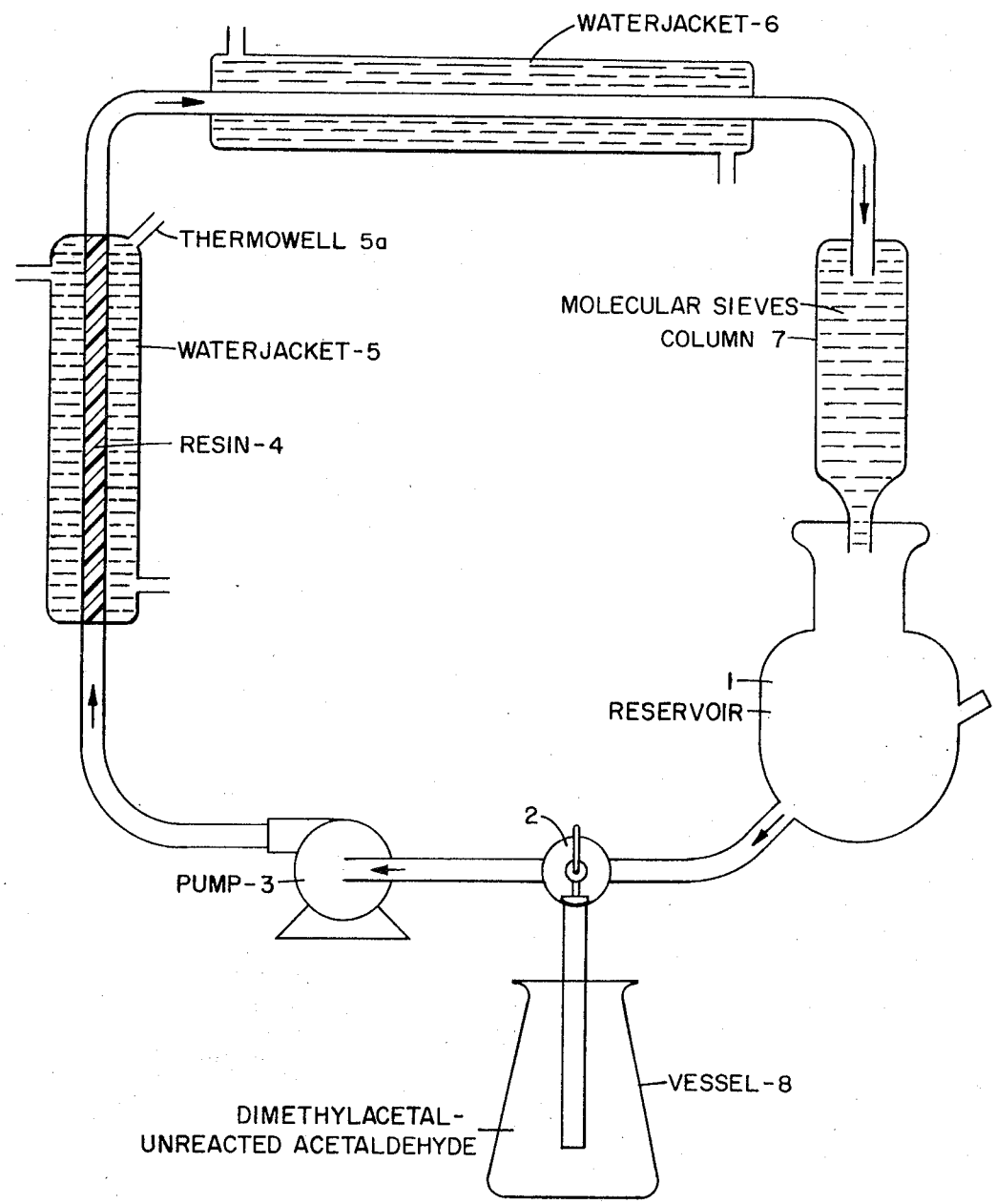

3,641,163
PROCESS FOR PREPARING DIMETHYLACETAL
Owen Portwood, Jr., Charles M. Starks, and Paul H. Washecheck, Ponca City, Okla., assignors to Continental Oil Company, Ponca City, Okla.
Filed Aug. 14, 1969, Ser. No. 850,152
Int. Cl. C07c 43/30
U.S. Cl. 260—615 A
4 Claims

ABSTRACT OF THE DISCLOSURE

Dimethylacetal is prepared by passing a mixture of acetaldehyde and methanol over an acidic catalyst. The water of reaction is removed by a dehydrating agent (e.g. molecular sieves), thereby driving the reaction to completion. Use of an excess of acetaldehyde results in a product mixture, after removal of water, comprising dimethylacetal and unreacted acetaldehyde. The dimethylacetal is recovered by distillation of the product mixture.

BACKGROUND

Many uses are known for dimethylacetal. For example, it can be used as a paint thinner, an additive for gasoline, and as an aerosol for spray cans.

It is well known to prepare acetals by the acid catalyzed reaction of aldehydes and alcohols. The reaction is an equilibrium reaction, which can be illustrated as follows:

$$R-CHO + 2R'OH \rightleftharpoons R-CH-(OR')_2 + H_2O$$

The preparation of dimethylacetal by the reaction of acetaldehyde and methanol presents several problems. First, dimethylacetal and methanol form a constant boiling azeotrope (containing 75% dimethylacetal and 25% methanol), which is very difficult to separate. Second, water is an undesired by-product and, as indicated by the equation shown above, prevents the reaction from going to completion. Using a large excess of methanol the reaction equilibrium can be forced to the right until 80 to 90% of the acetaldehyde has been converted to dimethylacetal. Upon neutralization at this point the reaction mixture can be fractionated into the following cuts:

(1) unreacted acetaldehyde
(2) dimethylacetal-methanol azeotrope
(3) excess methanol
(4) water.

As stated previously, the separation of the dimethylacetal-methanol azeotrope is very difficult.

We have discovered a process for preparing dimethylacetal which obviates the difficulties discussed in the foregoing. Our process uses a continuous flow reactor whereby the reactants (acetaldehyde and methanol) are first circulated over an acidic ion exchange resin and then over a dehydrating agent to remove water. Use of a stoichiometric excess of acetaldehyde makes possible the consumption of 95% or more of the methanol, leaving only dimethylacetal, unreacted acetaldehyde and a very small amount of methanol in the reactor. Since acetaldehyde boils at 25° C. and dimethylacetal at 65° C., the two can be separated easily.

PRIOR ART

U.S. Pat. No. 2,566,559 teaches a continuous process for the preparation of acetals by passing a mixture of alcohol and aldehyde over an acid cation exchange resin. Preferably, an excess of alcohol is used.

U.S. Pat. No. 2,668,862 teaches a process for preparing high molecular weight acetals (i.e. $C_{12}$ to $C_{42}$) using an acid catalyst. The patent teaches that the reaction is forced to completion by the addition of an anhydrous salt which removes the water. It further teaches that the acetal is then separated by the addition of an aqueous alcohol mixture in which the acetal is essentially insoluble.

U.S. Pat. No. 2,840,615 teaches a process for preparing dimethylacetal by the reaction of methanol with acetaldehyde containing ethylene oxide as an impurity. The process teaches the use of an acidic cation-exchange resin. An important feature of the process of this patent is the regeneration of the resin using hot water. While the patent teaches the preparation of dimethylacetal, it teaches a product mixture containing dimethylacetal—not dimethylacetal per se.

BRIEF SUMMARY OF THE INVENTION

Broadly stated, the present invention concerns a continuous process for preparing dimethylacetal wherein the process comprises:

(a) passing a mixture comprising a stoichiometric excess of acetaldehyde and methanol over an acidic ion exchange resin,
(b) passing the effluent mixture from step (a) over a dehydrating agent, and
(c) recovering dimethylacetal from the dehydrated effluent mixture.

In a preferred embodiment the reactants are recycled for a period of time, preferably, in a closed reaction system.

DETAILED DESCRIPTION

The drawing:

Our invention can be better understood by reference to the accompanying drawing which shows laboratory apparatus suitable for preparing dimethylacetal by our process. It should be readily apparent to those skilled in the art that commercial apparatus can be easily designed which will do the same job.

The acetaldehyde and methanol are introduced into the reservoir 1. From the reservoir 1 they pass through the valve 2 to the pump 3 which is used to circulate the reactants. From the pump 3 the reactants go through a column of ion exchange resin 4 which is surrounded by a water jacket 5, containing a thermowell 5a. The effluent from the ion exchange bed goes through a second water jacket 6, or other cooling means, and then through the column 7 containing the molecular sieves. The reactants pass into the reservoir 1 and are circulated continuously until the methanol has been substantially consumed. Once the desired amount of methanol has been consumed the valve 2 is turned to pass the product mixture to the vessel 8. Since the product mixture consists of dimethylacetal, unreacted acetaldehyde and a very small amount of methanol the dimethylacetal can be recovered from it easily by simple distillation. The unreacted acetaldehyde and small amount of dimethylacetal-methanol azeotrope obtained by distillation of the product mixture can be recycled to the reservoir 1.

MATERIALS AND PROCESS CONDITIONS

The ion exchange resin which is used as the catalyst should be strongly acidic. Such materials are well-known, with several being commercially available. U.S. Pat. No. 2,366,007 describes a suitable resin, which is a sulfonated styrene-divinyl benzene copolymer. Another suitable type of resin is the phenol sulfonic acid-formaldehyde reaction product.

Particularly suitable acidic ion exchange resins are available from Rohm and Haas Co. under the trademark "Amberlyst."

Since the use of acidic ion exchange resins to prepare acetals is well known and since this type of material is well known, further description is not believed necessary.

Many types of dehydrating agents, such as calcium chloride, sodium sulfate, phosphorus pentoxide, and molecular sieves are suitable for use in our process. Of these, molecular sieves are preferred.

A salient feature of our process is the use of a stoichiometric excess of acetaldehyde. We have found that using a 10% stoichiometric excess results in a slow reaction. Use of a 100% stoichiometric excess gives a good reaction rate. In view of these findings, our process suitably uses at least a 25% stoichiometric excess of acetaldehyde. Preferably, the stoichiometric excess is at least 100%.

As indicated in the description of the apparatus, preferably the reactants are circulated continuously until the methanol has been substantially consumed, i.e. the reaction is substantially complete. Stated more precisely, the reactants are circulated continuously until at least about 90% of the methanol has been consumed. Preferably, the reactants are circulated continuously until at least about 95% of the methanol has been consumed.

Temperature and pressure are not particularly important in conducting the process of our invention. For reasons of convenience we have operated under ambient conditions. Since the reaction of acetaldehyde and methanol is exothermic we have used mild cooling in order to maintain the reaction at room temperature. Since conceivably the reaction could be conducted at conditions other than ambient the use of such conditions falls with the scope of the invention.

In order to disclose more clearly the nature of the present invention and the advantages thereof, reference will hereinafter be made to certain specific embodiments which illustrate the flexibility of the herein-described process. It should be clearly understood, however, that this is done solely by way of example.

Example 1

This example illustrates the process of our invention employing the apparatus shown in the drawing. The example used a 100% stoichiometric excess of acetaldehyde. The acidic ion exchange resin was "Amberlyst" 15. The dehydrating agent was 35 grams of 3 A. molecular sieves.

Charge:
   Acetaldehyde 40 g. (0.91 mole)
   Methanol 28 g.[1] (0.88 mole)

[1] 18 g. of which was supported on the molecular sieves.

The methanol was added to the reservoir followed by the acetaldehyde. Addition of the acetaldehyde, due to the exothermic nature of the reaction, raised the temperature to 40° C. The pump was started, circulating the mixture through the apparatus at a rate of 300 ml./hr. After 10 minutes pumping the temperature was 25° C.

A sample withdrawn at the end of 35 minutes showed that 90% of the methanol had reacted. A sample taken after 90 minutes showed more than 95% of the methanol had reacted. At this point the valve was changed passing the reaction product to the flask. The product mixture consisted of dimethylacetal, acetaldehyde and a small amount of methanol. The dimethylacetal was recovered from the product mixture by means of distillation.

Example 2

In a run similar to Example 1, using a 10% stoichiometric excess of acetaldehyde, the reaction reached equilibrium in about 3 hours and showed no further progress. The reaction product was about 2:1 dimethylacetal:methanol. Use of a hot water jacket to increase reaction temperature and use of additional acetaldehyde did not increase the amount of dimethylacetal in the reaction product.

The invention having thus been described, what is claimed and desired to be secured by Letters Patent is:

1. A continuous process for preparing dimethylacetal wherein the process comprises:
   (a) passing a mixture comprising a stoichiometric excess of acetaldehyde and methanol over an acidic ion exchange resin to form a mixture comprising dimethylacetal, water, unreacted acetaldehyde and unreacted methanol,
   (b) passing the reaction mixture of step (a) over a dehydrating agent to remove the water,
   (c) repeating steps (a) and (b) until the reaction mixture contains not more than about 10% methanol,
   (d) recovering by distillation the dimethylacetal from the mixture of dimethylacetal, acetaldehyde and methanol, said process being characterized further in that (1) steps (a), (b), and (c) are conducted at ambient temperatures, and (2) the stoichiometric excess of acetaldehyde in step (a) is at least 25%.

2. The process of claim 1 wherein the stoichiometric excess of acetaldehyde is at least about 100%.

3. The process of claim 2 wherein the reaction mixture of step (c) contains not more than about 5% methanol.

4. The process of claim 3 wherein the dehydrating agent is molecular sieves.

References Cited

UNITED STATES PATENTS

| | | | |
|---|---|---|---|
| 1,850,836 | 3/1932 | Guinot | 260—615 A |
| 2,451,949 | 10/1948 | Heinemann | 260—615 A |
| 2,566,559 | 9/1951 | Dolnick et al. | 260—615 A |
| 2,668,862 | 2/1954 | Price | 260—615 A |
| 2,691,684 | 10/1954 | Frevel et al. | 260—615 A |
| 2,840,615 | 6/1958 | Stautzenberger | 260—615 A |

HOWARD T. MARS, Primary Examiner